United States Patent
Huang et al.

(10) Patent No.: US 12,376,079 B2
(45) Date of Patent: Jul. 29, 2025

(54) BANDWIDTH ALLOCATION SYSTEM AND METHOD

(71) Applicant: Compal Electronics, Inc., Taipei (TW)

(72) Inventors: Chun-Lin Huang, Taipei (TW); Man-Yun Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 459 days.

(21) Appl. No.: 17/827,435

(22) Filed: May 27, 2022

(65) Prior Publication Data

US 2023/0300802 A1     Sep. 21, 2023

(30) Foreign Application Priority Data

Mar. 17, 2022   (TW) .................................. 111109890

(51) Int. Cl.
*H04W 72/044* (2023.01)
*H04L 5/00* (2006.01)
*H04W 72/542* (2023.01)

(52) U.S. Cl.
CPC ......... *H04W 72/044* (2013.01); *H04L 5/0048* (2013.01); *H04W 72/542* (2023.01)

(58) Field of Classification Search
None
See application file for complete search history.

(56) References Cited

U.S. PATENT DOCUMENTS

| | | |
|---|---|---|
| 2016/0057742 A1 | 2/2016 | Berggren et al. |
| 2019/0394710 A1 | 12/2019 | Ugurlu et al. |
| 2020/0162889 A1* | 5/2020 | Desai ...................... H04W 8/12 |
| 2020/0252847 A1* | 8/2020 | Park .................. H04W 36/0055 |
| 2021/0235302 A1 | 7/2021 | Chande et al. |
| 2021/0288852 A1* | 9/2021 | Jia .......................... H04W 72/23 |
| 2022/0046553 A1* | 2/2022 | Kim .................... H04W 52/245 |
| 2022/0150730 A1* | 5/2022 | Freda .................... H04W 24/04 |

(Continued)

FOREIGN PATENT DOCUMENTS

| | | |
|---|---|---|
| CN | 102263583 A | 11/2011 |
| TW | I678123 B | 11/2019 |
| TW | 202015443 A | 4/2020 |

(Continued)

*Primary Examiner* — Jason E Mattis
*Assistant Examiner* — Bao G Nguyen
(74) *Attorney, Agent, or Firm* — KIRTON McCONKIE; Evan R. Witt

(57) ABSTRACT

The present disclosure a bandwidth allocation method including steps of: (a) providing a base station and a user equipment, wherein the base station provides a plurality of bandwidth parts for the user equipment within a service area; (b) selecting a bandwidth part from the plurality of bandwidth parts as a reference bandwidth part and utilizing the base station to transmit a reference signal through the reference bandwidth part; (c) utilizing the user equipment to receive the reference bandwidth part and output a channel report according to a channel status of the reference bandwidth part, wherein the channel report includes a channel quality indication; (d) determining whether the channel quality indication is greater than a first critical value, performing a step (e) when the determination result is not satisfied; and (e) instructing the user equipment to switch to a bandwidth part with a smaller frequency band as the reference bandwidth part.

10 Claims, 6 Drawing Sheets

(56) References Cited

U.S. PATENT DOCUMENTS

2023/0337201 A1* 10/2023 Alriksson ............. H04W 72/02
2023/0396393 A1* 12/2023 Yao ..................... H04B 7/0695

FOREIGN PATENT DOCUMENTS

| TW | I699978 B | 7/2020 |
|---|---|---|
| TW | I712277 B | 12/2020 |
| TW | I716710 B | 1/2021 |
| TW | 202107909 A | 2/2021 |
| TW | I734936 B | 8/2021 |
| TW | I735823 B | 8/2021 |
| TW | I736825 B | 8/2021 |
| TW | I737709 B | 9/2021 |
| WO | 2020028774 A1 | 2/2020 |
| WO | 2021026682 A1 | 2/2021 |

* cited by examiner

BANDWIDTH ALLOCATION SYSTEM AND METHOD

CROSS-REFERENCE TO RELATED APPLICATION

This application claims priority to Taiwan Patent Application No. 111109890, filed on Mar. 17, 2022, the entire contents of which are incorporated herein by reference for all purposes.

FIELD OF THE INVENTION

The present disclosure relates to a bandwidth allocation system and method, and more particularly to a progressive bandwidth allocation system and method applying to the 5th Generation mobile network (5G).

BACKGROUND OF THE INVENTION

In the 5G technology, the number of base stations (BS) is greatly increased compared to the previous generation mobile network technologies, and the deployment density of the cellular network will be more than ten times that of existing mobile network technologies. Therefore, the interference generated during the communication is increased. The interference coordination is a key technology for improving the performance of the cellular network, especially for the user equipment (UE) in the cell edge. In a high density deployment environment, the UE's user experience will be greatly improved by providing efficient resource block allocation.

One of the resource block allocation methods in the existing mobile network is to increase the number of resource blocks of the edge UE, thereby improving the throughput of the edge UE. However, increasing the number of resource blocks of the edge UE will reduce the number of resource blocks of the central UE and the overall throughput. In addition, if the edge UE shares the resource blocks with the central UE of the neighborhood interfering cell by increasing the signal-to-interference-plus-noise ratio of the edge UEs to reduce interference, it will cause the reduction of the transmit power of the center of the interfering cell, the throughput of the central UEs of the interfering cell, and the overall throughput.

Therefore, there is a need of providing a bandwidth allocation system and method to obviate the drawbacks encountered from the prior arts.

SUMMARY OF THE INVENTION

It is an object of the present disclosure to provide a bandwidth allocation system and method. In the bandwidth allocation system and method, the base station switches the bandwidth part used by the user equipment in a progressive manner according to the channel report returned by the user equipment. Thereby, the utilization efficiency of the resource blocks is improved, and the overall throughput of the system and the signal-to-interference-plus-noise ratio of the user equipment are maintained simultaneously. Therefore, the user experience of the user equipment is improved.

In accordance with an aspect of the present disclosure, there is provided a bandwidth allocation system. The bandwidth allocation system includes a base station and a user equipment. The base station provides a plurality of bandwidth parts for the user equipment within a service area. The base station selects a bandwidth part from the plurality of bandwidth parts as a reference bandwidth part and transmits a reference signal to the user equipment through the reference bandwidth part. The user equipment receives the reference signal and outputs a channel report to the base station according to a channel status of the reference bandwidth part, wherein the channel report includes a channel quality indication. The base station instructs the user equipment to switch to a bandwidth part with a smaller frequency band as the reference bandwidth part when the channel quality indication is smaller than a first critical value.

In accordance with an aspect of the present disclosure, there is provided a bandwidth allocation method. The bandwidth allocation method including steps of: (a) providing a base station and a user equipment, wherein the base station provides a plurality of bandwidth parts for the user equipment within a service area; (b) selecting a bandwidth part from the plurality of bandwidth parts as a reference bandwidth part and utilizing the base station to transmit a reference signal to the user equipment through the reference bandwidth part; (c) utilizing the user equipment to receive the reference signal and output a channel report to the base station according to a channel status of the reference bandwidth part, wherein the channel report includes a channel quality indication; (d) determining whether the channel quality indication is greater than a first critical value, and performing a step (e) when the determination result is not satisfied; and (e) instructing the user equipment to switch to a bandwidth part with a smaller frequency band as the reference bandwidth part, and performing the step (b) again after the step (e) is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
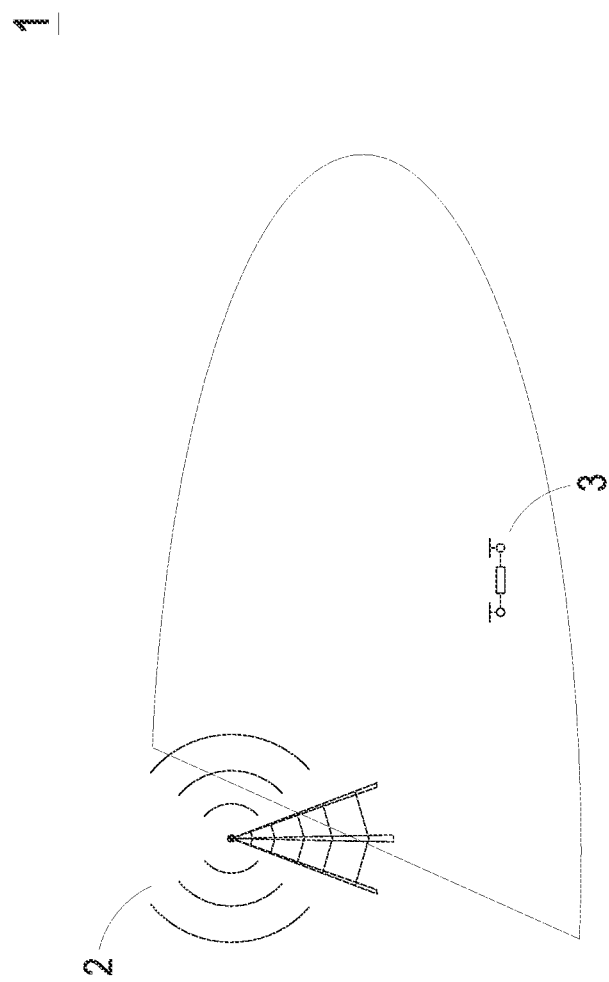
FIG. 1 is a schematic system diagram illustrating a bandwidth allocation system according to an embodiment of the present disclosure.
Figure 2:
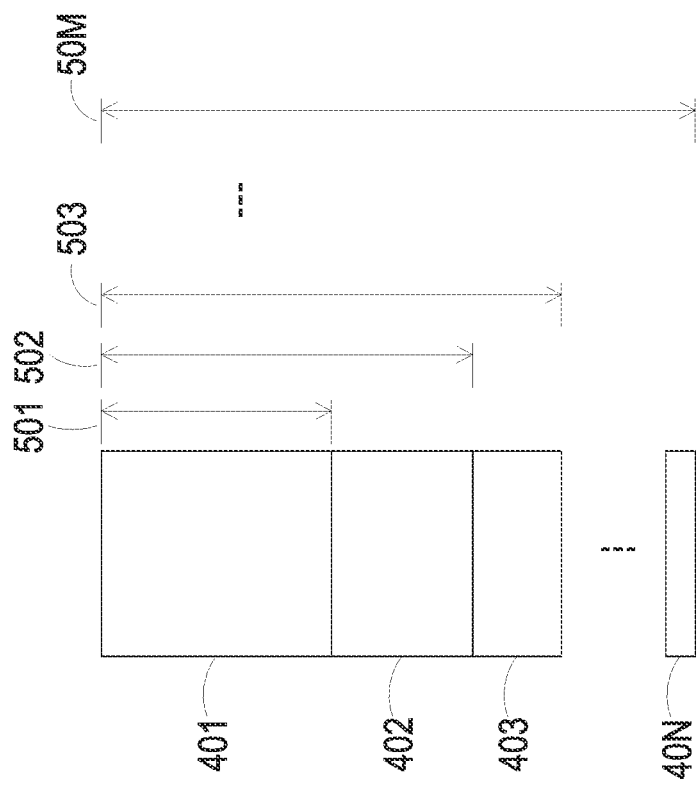
FIG. 2 is a schematic frequency band allocation diagram of the bandwidth allocation system of FIG. 1.

FIG. 1 is a schematic system diagram illustrating a bandwidth allocation system according to an embodiment of the present disclosure. FIG. 2 is a schematic frequency band allocation diagram of the bandwidth allocation system of FIG. 1. As shown in FIGS. 1 and 2, the bandwidth allocation system 1 of the present disclosure includes a base station 2 and a user equipment 3. The user equipment 3 is a wireless communication device, for example but not limited to mobile device, drone or remote control aircraft. The base station 2 provides M bandwidth parts for the user equipment 3 within a service area for data transmission between the base station 2 and the user equipment 3, where M is an integer greater than 1. The M bandwidth parts are formed by N resource blocks, where N is an integer greater than 1. Each of the N resource blocks has a corresponding frequency band, and the N resource blocks are a first to a Nth resource blocks 401-40N in descending order according to the size of the frequency band of the resource block. That is, the frequency band of the first resource block 401 is greater than the second resource block 402, the frequency band of the second resource block 402 is greater than the third resource block 403, and so on, the frequency band of the (N−1)th resource block 40 (N−1) is greater than the Nth resource block 40N, and the frequency band of the Nth resource block 40N is the one with the smallest frequency band among the N resource blocks.

In an embodiment, the bandwidth part includes resource blocks with continuous frequency bands. In the embodiment shown in FIG. 2, the first bandwidth part 501 includes the first resource block 401, the second bandwidth part 502 includes the first resource block 401 to the second resource block 402, and so on, the xth bandwidth part 50x includes the first to the xth resource blocks 401-40x, the Mth bandwidth part 50M includes the first to the Nth resource blocks 401-40N, where x is an integer greater than 1 and less than or equal to M. Since the bandwidth part includes resource blocks that are continuous in frequency band, the number of bandwidth parts is the same as the number of resource blocks, that is, M equals N. In another embodiment, the bandwidth part may also include resource blocks with discontinuous frequency bands. Under this circumstance, the number of bandwidth parts is greater than the number of resource blocks.

The bandwidth allocation system 1 of the present disclosure switches the bandwidth part used by the user device 3 according to the status of the data transmission between the base station 2 and the user device 3, so as to improve the user experience of the user equipment 3.

In order to detect the status of the data transmission between the base station 2 and the user equipment 3, the base station 2 selects a bandwidth part from the M bandwidth parts as a reference bandwidth part and transmits a reference signal to the user equipment 3 through the reference bandwidth part. In an embodiment, the reference signal is a demodulation reference signal or a channel state information reference signal. The user equipment 3 receives the reference signal and outputs a channel report to the base station 2 according to a channel status of the reference bandwidth part. The channel report includes a channel quality indication and a reference symbol received power. The greater the channel quality indication is, the smaller the interference is, and conversely, the smaller the channel quality indication is, the greater the interference is. Therefore, the channel state of the current reference bandwidth part can be reflected by the channel report, and the channel state represents the current user experience of the user equipment 3. In an embodiment, the user experience of the user equipment 3 is determined by the upload/download speed of the user equipment or the network delay. For example, when the upload/download speed is relatively high, it represents that the user equipment 3 has a better user experience, and conversely, when the upload/download speed is relatively low, it represents that the user equipment 3 has a poor user experience.

Figure 3:
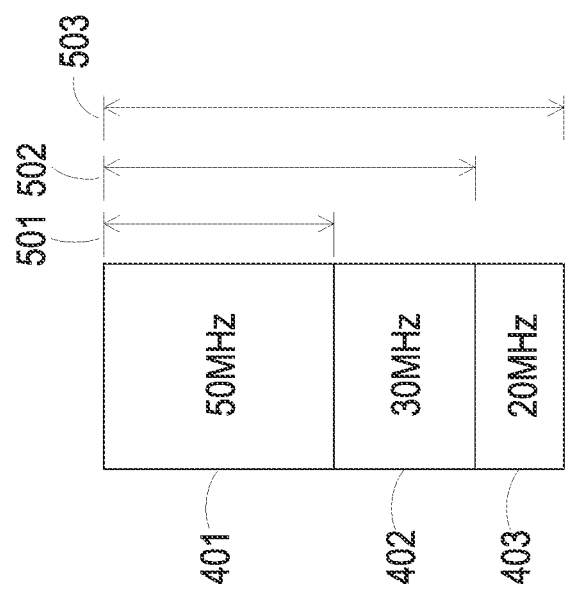
FIG. 3 is a schematic frequency band allocation diagram of a bandwidth allocation system according to another embodiment of the present disclosure.

When the bandwidth allocation system 1 includes three resource blocks, the relation between the resource blocks and the bandwidth parts is exemplified as follow. FIG. 3 is a schematic frequency band allocation diagram of a bandwidth allocation system according to another embodiment of the present disclosure. As shown in FIG. 3, in this embodiment, the bandwidth allocation system 1 includes three resource blocks, which are a first resource block 401, a second resource block 402 and a third resource block 403. The first resource block 401, the second resource block 402 and the third resource block 403 have corresponding frequency bands 50 MHz, 30 MHz and 20 MHz respectively. The first bandwidth part 501 includes the first resource block 401. The second bandwidth part 502 includes the first resource block 401 to the second resource block 402. The third bandwidth part 503 includes the first resource block 401 to the third resource block 403.

Figure 4:
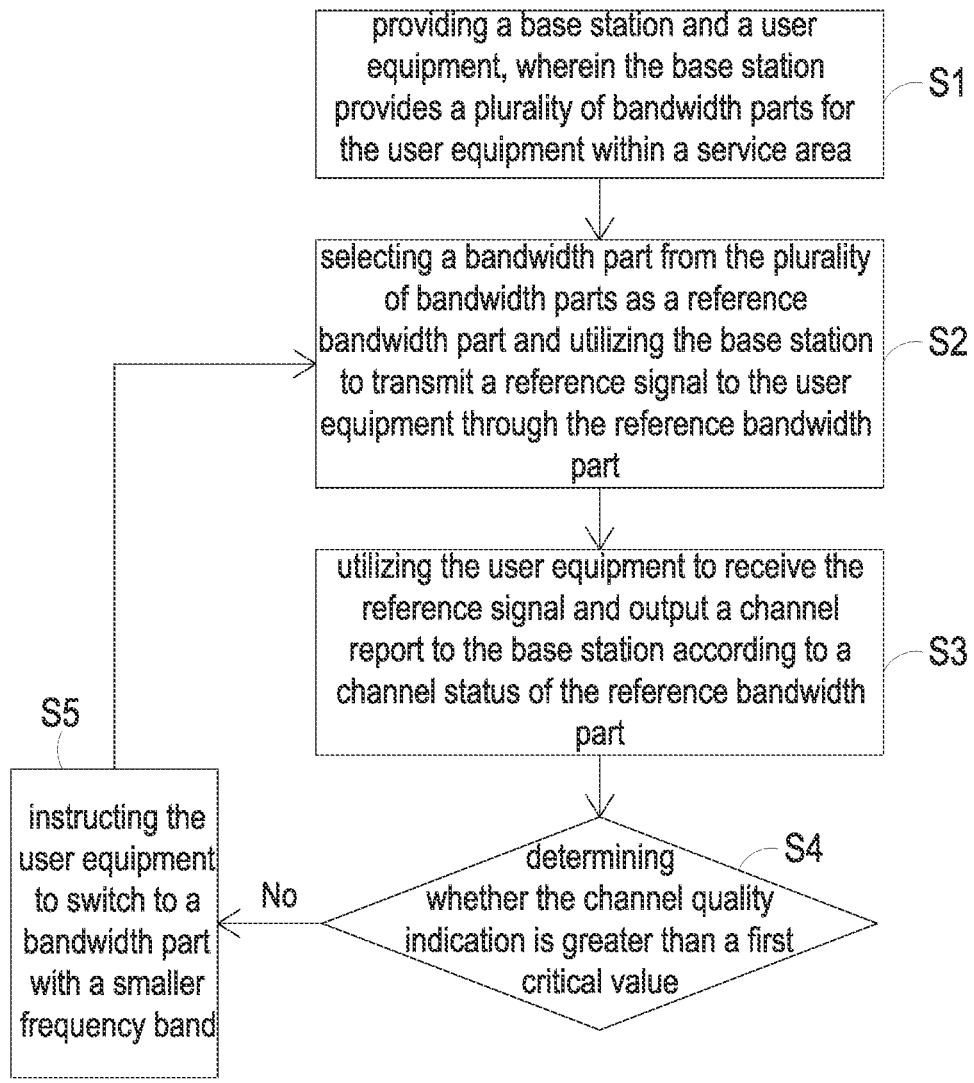
FIG. 4 is a flow chart illustrating a bandwidth allocation method according to an embodiment of the present disclosure.

Please refer to FIGS. 1 and 4. FIG. 4 is a flow chart illustrating a bandwidth allocation method according to an embodiment of the present disclosure. The bandwidth allocation method of the present disclosure is applicable for the bandwidth allocation system 1 stated above. In the bandwidth allocation system and method of the present disclosure, the channel quality indication is preferentially considered when determining the timing of switching the bandwidth parts. The bandwidth allocation system 1 of FIG. 1 and the bandwidth allocation method of FIG. 4 are exemplified to describe the timing and the specific manner of the base station 2 switching the bandwidth part used by the user equipment 3.

The bandwidth allocation method includes the following steps. In step S1, a base station 2 and a user equipment 3 is provided, wherein the base station 2 provides M bandwidth parts for the user equipment 3 within a service area, where M is an integer greater than 1. The M bandwidth parts are formed by N resource blocks, where N is an integer greater than 1. Each of the N resource blocks has a corresponding frequency band, and the N resource blocks are a first to a Nth resource blocks 401-40N in descending order according to the size of the frequency band of the resource block. The M bandwidth parts are formed by the N resource blocks, the first bandwidth part 501 includes the first resource block 401, the second bandwidth part 502 includes the first resource block 401 to the second resource block 402, and so on, the xth bandwidth part 50x includes the first to the xth resource blocks 401-40x, the Mth bandwidth part 50M includes the first to the Nth resource blocks 401-40N, where x is an integer greater than 1 and less than or equal to M.

In step S2, a bandwidth part is selected from the M bandwidth parts as a reference bandwidth part, and the base station 2 transmits a reference signal to the user equipment 3 through the reference bandwidth part. In step S3, the user equipment 3 receives the reference signal and outputs a channel report to the base station 2 according to a channel status of the reference bandwidth part, wherein the channel report includes a channel quality indication and the a reference symbol received power.

In step S4, the base station 2 determines whether the channel quality indication is greater than a first critical value T1. When the channel quality indication is smaller than the first critical value T1, it represents that the channel state of the reference bandwidth part is relatively poor due to the larger interference, so a step S5 is performed.

In step S5, the base station 2 instructs the user equipment 3 to switch to a bandwidth part with a smaller frequency band as the reference bandwidth part in a progressive manner, and the bandwidth part currently used by the current user equipment 3 is deemed as the reference bandwidth part to improve the channel status. Step S2 is performed again after step S5 is performed so as to determine the channel status of the current frequency bandwidth part again.

Taking the bandwidth parts shown in FIG. 3 as an example, the implementation of the foregoing steps is exemplified as follows. In step S2, assuming that the reference bandwidth part is the third bandwidth part 503 shown in FIG. 3, the base station 2 transmits the reference signal to the user equipment 3 through the frequency band (50+30+20) MHz corresponding to the third bandwidth part 503. In step S3, the user equipment 3 receives the reference signal and outputs a channel report to the base station 2 according to a channel status of the third bandwidth part 503. In step S4, whether the channel quality indication of the channel report of the third bandwidth part 503 is greater than a first critical value T1 is determined. In step S5, when the channel quality indication is smaller than the first critical value T1 (i.e., the channel state of the third bandwidth part 503 is relatively poor), the base station 2 instructs the user equipment 3 to switch from the third bandwidth part 503 to the second bandwidth part 502 in a progressive manner, wherein the frequency band of the second bandwidth part 502 is a step smaller than the third bandwidth part 503. That is, the data transmission is performed through the frequency band (50+30) MHz corresponding to the second bandwidth part 502, and the second bandwidth part 502 is deemed as the reference bandwidth part. Step S2 is performed again after the smaller bandwidth part is switched. That is, the base station 2 transmits a reference signal to the user equipment 3 through the reference bandwidth part (i.e., the second bandwidth part 502) currently used by the user equipment 3, and the channel status of the current bandwidth part is determined again. By switching to a bandwidth part with a smaller frequency band, the channel quality indication can be increased to improve the channel status.

In the bandwidth allocation system and method of the present disclosure, the base station switches the bandwidth part used by the user equipment in a progressive manner according to the channel report returned by the user equipment. Thereby, the utilization efficiency of the resource blocks is improved, and the overall throughput of the system and the signal-to-interference-plus-noise ratio of the user equipment are maintained simultaneously. Therefore, the user experience of the user equipment is improved.

In an embodiment, the base station 2 includes a timer. The timer is configured to count the maintenance time of the discriminative states of the channel quality indication and the reference symbol received power so that the base station 2 can instruct the corresponding commands in different channel states. The detailed timer counting method and the instructions to be performed when the counting time reaches the preset time are exemplified as follow.

Figure 5:
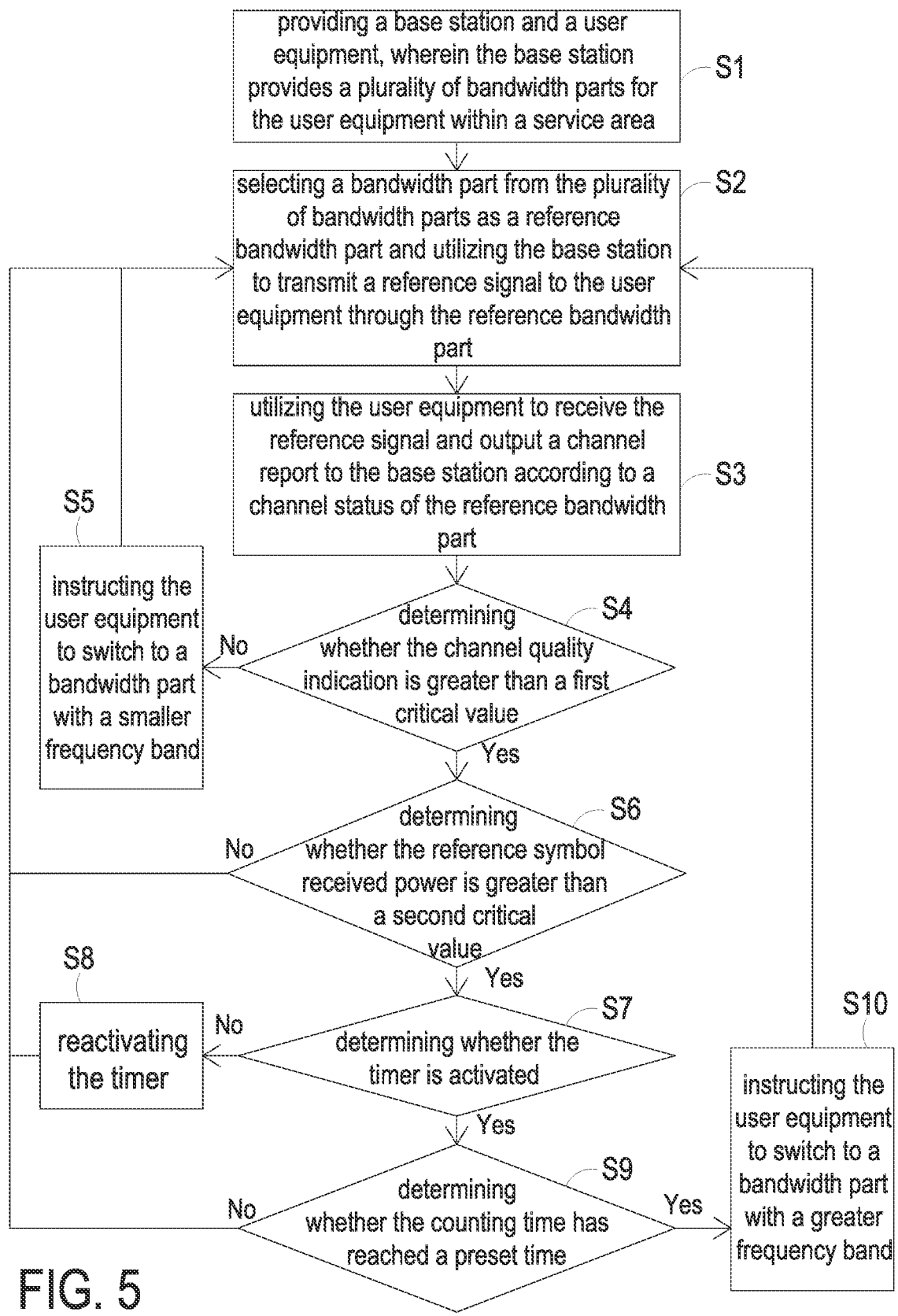
FIG. 5 is a flow chart illustrating a bandwidth allocation method according to another embodiment of the present disclosure.

Please refer to FIGS. 1 and 5. FIG. 5 is a flow chart illustrating a bandwidth allocation method according to another embodiment of the present disclosure. The bandwidth allocation method of the present disclosure is applicable for the bandwidth allocation system 1 of FIG. 1 and the bandwidth allocation method of FIG. 4. In this embodiment, the bandwidth allocation method further includes the following steps. When the determination result of step S4 is satisfied (i.e., the channel quality indication is greater than the first critical value T1), a step S6 is performed.

In step S6, whether the reference symbol received power is greater than a second critical value T2 is determined. When the reference symbol received power is smaller than the second critical value T2, it represents that the channel status of the reference bandwidth part is good and the signal strength received by the user equipment 3 is relatively low, so step S2 is performed again. When the reference symbol received power is greater than the second critical value T2, it represents that the signal strength received by the user equipment 3 is relatively high, so step S7 is performed.

In step S7, whether the timer is activated is determined. A step S8 is performed when the determination result of step S7 is not satisfied. In step S8, the timer of the base station 2 is reactivated to count the maintenance time of the reference symbol received power being greater than the second critical value T2. Step S2 is performed again after the timer is reactivated, that is, the base station 2 transmits the reference signal to the user equipment 3 again to determine the current channel state.

When the determination result of step S7 is satisfied (i.e., the timer is in the activated state), a step S9 is further performed. In step S9, whether the counting time of the timer has reached a preset time is determined. When the determination result of step S9 is not satisfied (i.e., the counting time of the timer of the base station 2 has not reached the preset time), the timer continues to count and step S2 is performed again, that is, the base station 2 transmits the reference signal to the user equipment 3 again to determine the current channel state.

When the determination result of step S9 is satisfied (i.e., the counting time of the timer has reached the preset time), it represents that the signal strength received by the user equipment 3 keeps in high level for a period of time, so a step S10 is performed.

In step S10, the base station 2 is controlled to instruct the user equipment 3 to switch to a bandwidth part with a greater frequency band as the reference bandwidth (i.e., the bandwidth part currently used by the user equipment 3 is deemed as the reference bandwidth part), and step S2 is performed again after step S10 is performed to determine the channel status of the current reference bandwidth part.

The switching method from a bandwidth part with a smaller frequency band to a bandwidth part with a greater frequency band in step S10 corresponds to the embodiment shown in FIG. 3 and is described as follow. Assuming that the current reference bandwidth part is the first bandwidth part 501 shown in FIG. 3, the base station 2 instructs the user equipment 3 to switch from the first bandwidth part 501 to the second bandwidth part 502 in a progressive manner, wherein the frequency band of the second bandwidth part 502 is a step greater than the first bandwidth part 501. That is, the data transmission is performed through the frequency band (50+30) MHz corresponding to the second bandwidth part 502, and the second bandwidth part 502 is deemed as the reference bandwidth part. When the signal strength received by the user equipment 3 continues to be high for a period of time, by switching to the bandwidth part with a greater frequency band, the overall resource block usage efficiency is improved.

In the condition that the reference bandwidth part is the first bandwidth part 501 (that is, the bandwidth part with the smallest frequency band in the base station 2), the base station 2 has no bandwidth part smaller than the first bandwidth part 501. Therefore, if the channel quality indication is smaller than the first critical value T1, the base station 2 instructs the user equipment 3 to maintain the current bandwidth part 501 as the reference bandwidth part.

In the condition that the reference bandwidth part is the Mth bandwidth part 50M (that is, the bandwidth part with the greatest frequency band in the base station 2), the base station 2 has no bandwidth part greater than the Mth bandwidth part 50M. Therefore, when the channel quality indication is greater than the first critical value T1 and the reference symbol received power is greater than the second critical value T2, and the counting time has reached the preset time, the base station 2 instructs the user equipment 3 to maintain the current bandwidth part 50M as the reference bandwidth part.

In an embodiment, when a new user equipment enters the service area of the base station 2 from outside the service area of the base station 2, the base station 2 preferentially allocates its smallest bandwidth part to the new user equipment. Namely, the first bandwidth part 501 is selected as the reference bandwidth part for the new user equipment. Further, the status of the data transmission between the base station 2 and the new user equipment 3 is detected. The actual channel status determination and bandwidth part switching method are the same as that of the bandwidth allocation system 1 shown in FIGS. 1 and 2, and the detailed descriptions thereof are omitted herein.

Figure 6:
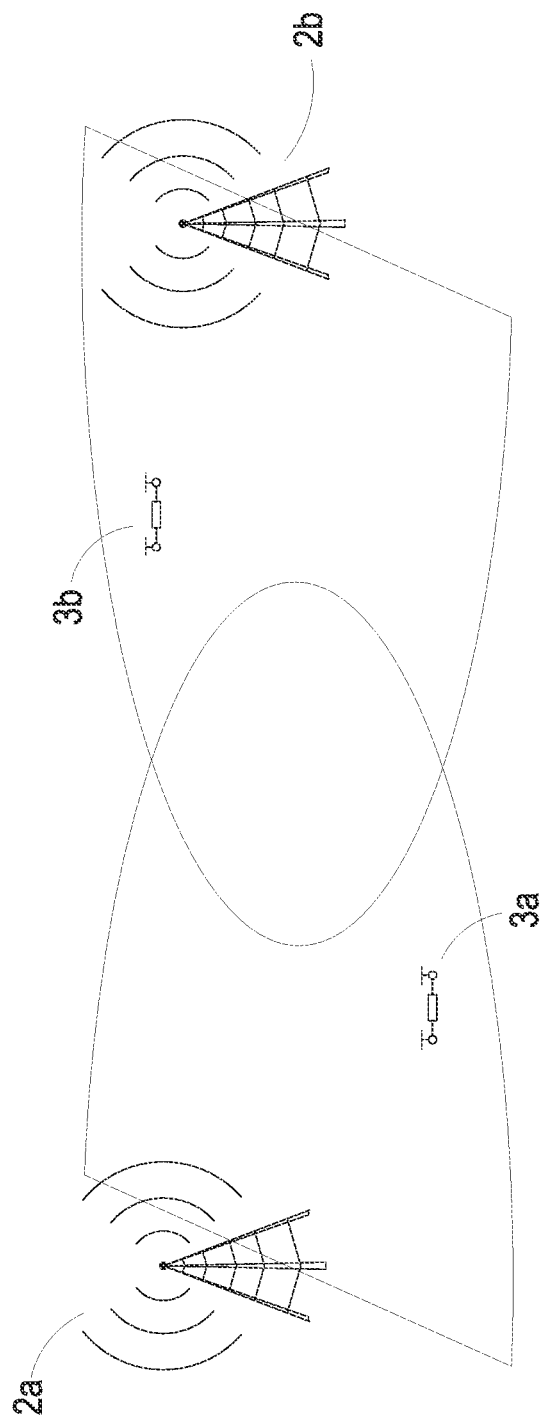
FIG. 6 is a schematic system diagram illustrating a bandwidth allocation system according to another embodiment of the present disclosure.

In an embodiment, the bandwidth allocation system is not limited to include one base station and one user equipment. In the embodiment shown in FIG. 6, the bandwidth allocation system 1a includes two base stations 2a and 2b and two user equipments 3a and 3b correspond to the two base stations 2a and 2b respectively. The base stations 2a and 2b provide M bandwidth parts for the user equipments 3a and 3b within their service area respectively. In this embodiment, the bandwidth part switching methods of the base stations 2a and 2b and their corresponding user equipments 3a and 3b are as the same as that of the bandwidth allocation system 1 shown in FIGS. 1 and 2, and the detailed descriptions thereof are omitted herein.

From the above descriptions, the present disclosure provides a bandwidth allocation system and method. In the bandwidth allocation system and method, the base station switches the bandwidth part used by the user equipment in a progressive manner according to the channel report returned by the user equipment. Thereby, the utilization efficiency of the resource blocks is improved, and the overall throughput of the system and the signal-to-interference-plus-noise ratio of the user equipment are maintained simultaneously. Therefore, the user experience of the user equipment is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bandwidth allocation method comprising steps of:
   (a) providing a base station and a user equipment, wherein the base station provides a plurality of bandwidth parts for the user equipment within a service area;
   (b) selecting a bandwidth part from the plurality of bandwidth parts as a reference bandwidth part and utilizing the base station to transmit a reference signal to the user equipment through the reference bandwidth part;
   (c) utilizing the user equipment to receive the reference signal and output a channel report to the base station according to a channel status of the reference bandwidth part, wherein the channel report comprises a channel quality indication;
   (d) determining whether the channel quality indication is greater than a first critical value, and performing a step (e) when the determination result is not satisfied; and
   (e) instructing the user equipment to switch to a bandwidth part with a smaller frequency band as the reference bandwidth part, and performing the step (b) again after the step (e) is performed,
   wherein the channel report further comprises a reference symbol received power,
   wherein when the determination result of the step (d) is satisfied, the bandwidth allocation method further comprises step of:
   (f) determining whether the reference symbol received power is greater than a second critical value, and performing the step (b) again when the determination result is not satisfied,
   wherein the base station further comprises a timer, when the channel quality indication is greater than the first critical value and the reference symbol received power is greater than the second critical value, the timer of the base station activates to count,
   wherein when the determination result of the step (f) is satisfied, the bandwidth allocation method further comprises steps of:
   (g) determining whether the timer of the base station is activated, performing a step (i) when the determination result is satisfied, and performing a step (h) when the determination result is not satisfied;
   (h) reactivating the timer of the base station, and performing the step (b) again after the timer is reactivated;
   (i) determining whether a counting time of the timer has reached a preset time, performing a step (j) when the determination result is satisfied, and performing the step (b) again when the determination result is not satisfied; and
   (j) instructing the user equipment to switch to a bandwidth part with a greater frequency band as the reference bandwidth, and performing the step (b) again after the step (j) is performed.

2. The bandwidth allocation method according to claim 1, wherein the base station provides M bandwidth parts for the user equipment within the service area, the M bandwidth parts are formed by N resource blocks, where M and N are integers greater than 1 respectively, each of the N resource block has a corresponding frequency band, and the N resource blocks are a first to a Nth resource blocks in descending order according to the size of the frequency band of the resource block.

3. The bandwidth allocation method according to claim 2, wherein a first bandwidth part comprises the first resource block, a xth bandwidth part comprises the first to a xth resource blocks, a Mth bandwidth part comprises the first to the Nth resource blocks, where x is an integer greater than 1 and less than or equal to M, and M equals N.

4. The bandwidth allocation method according to claim 1, wherein the reference signal is a demodulation reference signal.

5. The bandwidth allocation method according to claim 1, wherein the reference signal is a channel state information reference signal.

6. A bandwidth allocation system, comprising:
   a base station; and a user equipment, wherein the base station provides a plurality of bandwidth parts for the user equipment within a service area, wherein the base station selects a bandwidth part from the plurality of bandwidth parts as a reference bandwidth part and transmits a reference signal through the reference bandwidth part, the user equipment receives the reference signal and outputs a channel report according to a channel status of the reference bandwidth part, wherein the channel report comprises a channel quality indication, wherein the base station instructs the user equipment to switch to a bandwidth part with a smaller frequency band as the reference bandwidth part when the channel quality indication is smaller than a first critical value, wherein the channel report further comprises a reference symbol received power, the base station further comprises a timer, when the channel quality indication is greater than the first critical value and the reference symbol received power is greater than a second critical value, the timer of the base station activates to count, wherein when a counting time of the timer of the base station has reached a preset time, the base station instructs the user equipment to switch to a bandwidth part with a greater frequency band as the reference bandwidth.

7. The bandwidth allocation system according to claim 6, wherein the base station provides M bandwidth parts for the user equipment within the service area, the M bandwidth parts are formed by N resource blocks, where M and N are integers greater than 1 respectively, each of the N resource block has a corresponding frequency band, and the N resource blocks are a first to a Nth resource blocks in descending order according to the size of the frequency band of the resource block.

8. The bandwidth allocation system according to claim 7, wherein a first bandwidth part comprises the first resource block, a xth bandwidth part comprises the first to a xth resource blocks, a Mth bandwidth part comprises the first to the Nth resource blocks, where x is an integer greater than 1 and less than or equal to M, and M equals N.

9. The bandwidth allocation system according to claim 6, wherein the reference signal is a demodulation reference signal.

10. The bandwidth allocation system according to claim 6, wherein the reference signal is a channel state information reference signal.

* * * * *